United States Patent Office 3,215,665
Patented Nov. 2, 1965

3,215,665
RESINOUS COMPOSITIONS
Robert R. Sharetts, Reading, Pa., and James A. Melchore, Middlesex, N.J., assignors to American Cyanamid Company, Stamford, Conn., a corporation of Maine
No Drawing. Continuation of application Ser. No. 709,213, Jan. 16, 1958. This application Mar. 28, 1963, Ser. No. 268,542
8 Claims. (Cl. 260—45.95)

This application is a continuation application of our copending application Serial No. 709,213, filed January 16, 1958, now abandoned, which application was in turn a continuation-in-part of our earlier application having the Serial No. 384,525, filed October 6, 1953, also now abandoned.

This invention relates to novel light-stabilized resinous compositions and to the methods for preparing same. This invention further relates to resinous compositions resistant to the discoloring effects of ultraviolet light wherein the active light-stabilizer comprises an o-hydroxy benzophenone containing polymerizable non-benzenoid unsaturation. In narrower aspects, this present invention relates to light-stabilized, thermoplastic resinous compositions comprising an effective amount of an ultraviolet absorbing substance of the formula:

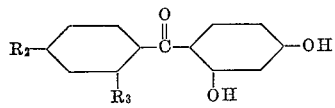

in which R is a radical containing a >C=C< group, $R_2$ is alkoxy, alkyl, halogen, hydrogen or OR and $R_3$ is hydrogen or OH, copolymerized with a different vinyl monomer or blended with a vinyl polymer and to the process for preparing same.

An object of this invention is to provide improved resinous compositions capable of absorbing ultraviolet light without significant deterioration.

Another object of this invention is to provide light-stable resinous compositions wherein an effective amount of an ultraviolet absorber is an integral component of said resinous composition.

A still further object of this present invention is to provide light-stable resinous compositions in bulk and film forms wherein the ultraviolet absorbing ingredient thereof is resistant to being leached out or evaporated therefrom.

These and other objects and advantages of the invention will be apparent to those skilled in the art especially upon consideration of the detailed disclosure hereinbelow.

Various benzophenones have been suggested in the prior art as ultraviolet absorbing agents for plastic materials. In order to be a good ultraviolet absorber, the benzophenone should absorb the ultraviolet light and at the same time be a substantially colorless material which imparts little or no color to the compositions in which it is used. Also, it should be sufficiently stable to withstand the conditions of forming or curing of the plastic, and should absorb ultraviolet light sufficiently to protect the plastic composition itself as well as any materials being shielded therewith against yellowing, degradation or decomposition upon exposure to ultraviolet light. Furthermore, the benzophenone must have sufficient solubility in one or more of the various components comprising the plastic formulation so it may be easily and uniformly incorporated therein. It is in this regard that the benzophenones of the present invention are admirably suited to obtain uniform dispersibility as will be shown in more detail hereinbelow.

Generally, an effective ultraviolet absorber should have its peak absorption above a wave length of 320 millimicrons. The absorption peak may be at a higher wave length, as long as absorption drops off sufficiently as it approaches the visual range so that the absorbing compound contributes little or no visible color. In addition, to be effective, it should show a high degree of absorbency in the desired wave length range. As a measure of the degree of absorbency, an absorption index may be used. This represents the degree of absorption of light of a selected wave length per amount of material with a higher absorbency index indicating greater absorption. For the most desirable ultraviolet protection, the peak absorbency index should occur at a wave length sufficiently below the visual range so that the absorbing compound has little or no yellow color. The benzophenones of this invention exceed the minimum requirements of the above-stated absorption properties which characterize an effective ultraviolet absorber.

A particularly advantageous attribute of the benzophenones of this invention is that they are capable of copolymerizing with other polymerizable materials by virtue of their non-benzenoid unsaturation. Thus, it has been discovered that effective amounts of these benzophenones can be chemically incorporated within resinous structures derived essentially from other type polymerizates. Often, a deficiency exists in prior art UV absorbers in that they show a tendency to be leached out of plastics into which they have been incorporated by solvents. Or substantial amounts may be lost by evaporation during the hot molding or other heat treatments to which the plastics may be subjected, either in fabrication procedures or in service conditions encountered after the fabrication. It is obvious that any substantial loss of the light-stabilizing agent by evaporation will seriously impair the plastic's resistance to color degradation. Also, it can be readily appreciated that loss by leaching processes is of extremely important consideration. In such an application, the light-stable properties of the plastic are adversely affected. Our benzophenones are capable of being incorporated in many plastic compositions in such a manner which precludes their migration therefrom.

While the ability of the benzophenones of this invention to copolymerize with other polymerizable material forms one of the more important aspects of this invention, it is to be understood that we contemplate herein the physical mixture of these benzophenones with a resinous material as well as the presence of these substances in a concurrent state of chemical and physical combination. It is significant to mention that our unsaturated benzophenones are easily incorporated into various plastic formulations because of their acceptable solubility characteristics in a host of plastic compositions.

This invention is based, in essence, on the discovery that benzophenones of the structure:

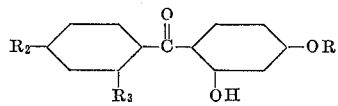

in which R is a radical containing a $>C=C<$ group, which we broadly term an olefinic group and which specifically contemplates an alkenyl group containing from 2 to 6 carbon atoms, an alkadienyl group containing from 4 to 6 carbon atoms or an alkenyloxy alkoxy group containing up to 6 carbon atoms, $R_2$ is hydrogen, alkoxy containing not in excess of 18 carbon atoms, halogen, alkyl, or OR, and $R_3$ is hydrogen or hydroxyl, are excellent ultraviolet absorbers for geenral use in plastic compositions and are especially unique in that they are capable of copolymerizing with other polymerizable ingredients of the ethylenic type and consequently become an integral part of a polymer molecule.

The olefinicoxy benzophenomes of our invention may be prepared in various ways. A convenient general way is by the selective alkenylation of the requisite polyhydroxy benzophenone (e.g., either 2,4-dihydroxy benzophenone, 2,2',4-trihydroxy benzophenone or 2,2,4,4'-tetrahydroxy benzophenone) to replace the hydrogens on the parahydroxyls, but to leave the ortho-hydroxyls untouched. This is achieved under ordinary conditions of reaction by using the proper stoichiometrical amount of alkenylating agent and no more, since the parahydroxyls are noticeably more reactive and are attacked first. The alkenylating agent is usually a halide of the desired group containing unsaturation. Examples of such agents (whose organic residue thus becomes the unsaturated radical R in the general formula given hereinabove) are allylchloride, allylbromide, methallylchloride and bromide, 2-chloroacrylonitrile, crotyl chloride and bromide, 2-chloroethylvinyl ether and the like.

Alkenylation can also be accomplished by reaction with acetylenic compounds. These introduce an unsaturated radical with the double bonded carbon directly attached to the oxygen. Such acetylenic compounds include acetylene, propyne-1, propyne-2, butyne-1, butyne-2 and the like. Alkenylacetylenes such as vinyl acetylene can also be used giving dienyloxy benzophenones such as 4-butadienyloxy-2-hydroxy benzophenone and 4,4' bis (butadienyloxy)2,2'-dihydroxy benzophenone. The acetylenic compounds can also be reacted with p-hydroxyalkyl o-hydroxy benzophenones to give the corresponding p-alkenyloxy alkoxy or alkadienyloxy alkoxy benzophenones.

Another method which can be used to prepare the light-stabilizers of our invention is to react a halogen substituted alkoxy benzophenone (the halogen being in the alkyl group) with alkali to form the ethylenic double bond in the side chain.

Further details concerning the preparation of these unsaturated benzophenones will be found in the specific embodiments set forth hereinbelow.

We have found that a resinous product of increased color stability is obtained by the use of from about 0.01% to about 5% normally and ranging to as high as 10% and more based on the total weight of the resin of a benzophenone corresponding to the general formula given hereinabove. However, in most instances, it is preferred that from about 0.1% to about 1% by weight of the UV absorber represented by said general formula being employed. Illustrative examples of the compounds represented by the general formula are such as 2-hydroxy-4-allyloxy benzophenone; 2,2'-dihydroxy-4-allyloxy benzophenone; 2-hydroxy-4,4'-diallyloxy benzophenone; 2,2'-dihydroxy-4,4'diallyloxy benzophenone; 2-hydroxy-4-methallyloxy benzophenone; 2,2' - dihydroxy - 4 - methallyloxy-4'-allyloxy benzophenone; 2,2'-dihydroxy-4-crotoxy benzophenone; 2-hydroxy-4-crotoxy benzophenone; 2-hydroxy-4-penten-2-yl-oxy benzophenone; 2,2'-dihydroxy-4-penten-4-yl-oxy benzophenone; 2-hydroxy-4,4'-dipenten-3-yl-oxy benzophenone; 2-hydroxy-4-hexen-2-yl-oxy benzophenone; 2,2'-dihydroxy - 4 - hexen-3-yl-oxy benzophenone; 2-hydroxy-4,4'-dihexen-2-yl-oxy benzophenone; 2-hydroxy-4-vinyloxy benzophenone; 2,2'-dihydroxy-4-vinyloxy benzophenone; 2-hydroxy-4,4'-divinyloxy benzophenone; 2-hydroxy-4-butandien-1-yl-oxy benzophenone; 2-hydroxy-4-vinyloxy-butoxy benzophenone; 2,2'-dihydroxy-4-allyloxymethoxy benzophenone; 2-hydroxy-4,4'-divinyloxymethoxy benzophenone; 2-hydroxy-4-allyloxy-ethoxy benzophenone; 2,2'-dihydroxy-4-crotoxymethoxy benzophenone; 2,2'-dihydroxy-4,4'-divinyloxybutoxy benzophenone; 2-hydroxy-4-methallyloxy-ethoxy benzophenone; 2,2'-dihydroxy-4-methallyloxymethoxy benzophenone; 2,2'-dihydroxy-4-butadienoxyethoxy benzophenone; 2-hydroxy-4-allyloxy-4'-ethoxy benzophenone; 2,2'-dihydroxy-4-methallyloxyethoxy-4'-butoxy benzophenone; 2-hydroxy-4-butadienoxyethoxy-4'-propoxy benzophenone; 2,2'-dihydroxy-4-(2-cyanovinyloxy)-4'-methoxy benzophenone; 2-hydroxy-4-allyloxy-4'-butyl benzophenone; 2, 2'-dihydroxy-4-methallyloxy-4'-chloro benzophenone; 2-hydroxy-4-crotoxy-4'-bromo benzophenone and 2,2'-dihydroxy-4-vinyloxy-butoxy-4'-methyl benzophenone.

The thermoplastic resinous compositions which may be color stabilized in accordance with our invention, that is, wherein the benzophenone is physically or chemically combined therewith include both copolymers and homopolymers of compounds represented by the general formula:

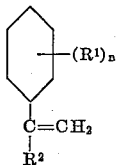

wherein $R^1$ is a lower alkyl radical having 1 to 4 carbon atoms, halogens such as chlorine, bromine, iodine and fluorine, n is an integer of from 0 to 2 and $R^2$ is a member selected from the group consisting of hydrogen and lower alkyl radicals. Examples of such compounds which may be listed are styrene per se, nuclear-substituted alkyl styrenes, e.g., o-, m-, and p-methyl styrenes, 2,3- and 2,5-dimethyl styrene, p-ethyl styrene, m-propyl styrene and the like; nuclear-substituted halo-alkyl styrenes, e.g., p-chloromethyl styrene, m-dibromoethyl styrene and the like, nuclear-substituted halo styrenes, e.g., o-, m- and p-chloro styrenes, o-, m- and p-bromostyrenes, 2,3-, 3,5-, and 2,4-dichloro styrene, 2-iodo, 3-methyl styrene and the like; alpha-substituted styrenes, e.g., alpha-methyl styrene, alpha-ethyl styrene, alpha-chloro styrene, alpha-bromo styrene, alpha-iodoethyl styrene and the like. Mixtures of these styrene compounds may also be employed if desired. Other monomers that may be used singly, in combination with one another or in combination with the styrenes mentioned hereinabove include such monomers as acrylonitrile; the various substituted acrylonitriles (e.g., methacrylonitrile, ethacrylonitrile, phenylacrylonitrile, etc.); the various acrylamides and substituted acrylamides (e.g., methacrylamide, ethacrylamide); the various N-substituted acrylamides and N-substituted alkacrylamides, for instance N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides; N-monoaryl and -diaryl acrylamides and the alkacrylamides, e.g., N-monophenyl and -diphenyl acrylamides and methacrylamides, etc.; vinyl esters, e.g., vinyl acetate, vinyl propionate, vinyl butyrate, vinyl isobutyrate, vinyl valerate, vinyl acrylate, vinyl methacrylate, etc.; esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than 4 carbon atoms in the alkyl grouping, and the like and allyl compounds such as the diallyl esters of phthalic, malonic, adipic, sebacic and endomethylene phthalic acid, allyl esters of acrylic, methacrylic and like acids, allyl alpha-hydroxy isobutyrate, diallyl gluconate allyl trichlorosilane, etc.

The unsaturated benzophenones of this invention are particularly effective in light-stabilizing polymeric materials derived from ethylene, propylene, butylene and the like.

The thermoplastic homopolymers and copolymers mentioned hereinabove may be prepared by polymerizing the respective monomers or comonomers in a manner well known in the art. The polmerization procedure may be carried out in bulk, emulsion or in solution state. In the latter case, various inert organic solvents may be employed, depending upon the particular monomer or monomer mixture employed, for example, toluene, xylene, dioxane, esters (e.g., butyl acetate), ketones (e.g., methylethylketone), tertiary alcohols, for instance, tertiary-butyl alcohol, as well as other solvents. When the polymerization is effected in solution state, a temperature at or approaching the boiling temperature of the solution generally is used.

Any of the polymerization catalysts which are suitable for use in polymerizing compounds containing an ethylenically unsaturated grouping, specifically a vinyl grouping, can be employed. Among such catalysts are the inorganic peroxides and the various organic peroxy catalysts, none of which needs to be specifically recited as they are well known in the art. As indicated, the polymerization also can be accomplished by conventional bulk polymerization techniques. Additionally, the polymerization may be carried out in an aqueous solution medium, for instance, in the polymerization of a monomer such as acrylamide.

An important class of resinous compositions wherein our benzophenones are particularly effective in arresting the deleterious effects of light include the conventionally termed polyester compositions. These compositions comprise an essentially linear ethylenically unsaturated polyester resin in combination with a vinyl or allyl monomer cross-linking agent. The unsaturated benzophenones of this invention may be physically admixed with these copolymerizable ingredients or they may be added to the reaction mixture comprising the ingredients used to prepare the unsaturated alkyd resin. In following this latter procedure, there is provided an opportunity for the benzophenone to coreact with the unsaturated polyester resin composition during the preparation thereof. In the preparation of the unsaturated polyester portion of the polyester composition, one may use the alpha,beta-ethylenically unsaturated polycarboxylic acids such as maleic, fumaric, aconitic, itaconic, monochloromaleic anhydride and the like. These unsaturated acids should be present in an amount approximating at least 20% by weight of the total weight of the polycarboxylic acids used and preferably in amounts varying between about 25% and 65% by weight based on the total weight of polycarboxylic acid present. If it is desired to use polycarboxylic acids which are free of non-benzenoid unsaturation, one may use such acids as phthalic, malonic, succinic, adipic, sebacic, azelaic and chlorinated polycarboxylic acids such as tetrachlorophthalic anhydride, and the like, but in amounts less than a larger proportion of the total amount of polycarboxylic acids present. Whenever available, the anhydrides of these acids may be substituted therefor in whole or in part.

As polyhydric alcohols which may be used to prepare the unsaturated polyesters of the present invention, it is preferred to employ those alcohols having only two hydroxy groups, optionally with minor amounts of alcohols having three or more hydroxy groups. Among the suitable alcohols are ethylene glycol, diethylene glycol, propylene glycol, dipropylene glycol, butanediol-1,4, butanediol-1,3, butanediol-1,2, pentanediol-1,2, pentanediol-1,3, pentanediol-1,4, pentanediol-1,5, hexanediol-1,6, and the like, also glycerol, pentaerythritol, dipentaerythritol and the like.

The unsaturated linear alkyd component may be formed in conventional manner by reacting one or more of these polycarboxylic acids with one or more of the polyhydric alcohols to produce material having an acid number below about 55, and desirably between about 35 and 40.

The cross-linking monomer for the polyster resin is a polymerizable material having a $CH_2=C<$ group and desirably boiling above 60° C. Amongst these polymerizable compounds are styrene, side chain substituted styrenes such as the alpha methylstyrene, alpha-ethyl styrene, and the like, or ring-substituted styrene, such as ortho, meta and para-alkyl styrenes such as o-methyl styrene, p-ethyl styrene, meta-propyl styrene, 2,4-dimethyl styrene, 2,5-diethyl styrene, and the like. Still further, one can make use of the allyl compounds such as diallyl phthalate, allyl alcohol, methallyl alcohol, allyl acetate, allyl methacrylate, dially carbonate, allyl lactate, allyl alpha-hydroxyisobutyrate, allyl trichlorosilane, allyl acrylate, diallyl malonate, diallyl oxalate, diallyl gluconate, diallyl methyl gluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyltrimesate, triallyl aconitate, triallyl cyanurate, triallyl citrate, triallyl phosphate, trimethallyl phosphate, tetraallyl silane, tetraallyl silicate, hexallyl disiloxane, and the like.

Many examples of the preparation, use and suitable additives for such unsaturated polyester resin formulations are disclosed in detail in Ellis Patent No. 2,255,313 and Kropa Patents Nos. 2,443,735 to 2,443,741, inclusive.

Since a salient feature of this present invention concerns the molecular incorporation of an unsaturated benzophenone into a resinous structure, details regarding this procedure will be set out hereinbelow. Although this technique is broadly appliciable in regard to various types of polymerizable monomers, the method will be specifically illustrated with styrene. Thus, in the formation of such a polymer, the unsaturated benzophenone is mixed with the styrene monomer and the polymer is formed by heating, using a conventional catalyst, if desired, such as benzoyl peroxide. A catalyst for polymerization is not imperative but should be used in those situations in which polymerization is aided by the presence of a catalyst in the usual catalytic quantities. Since these unsaturated benzophenones are copolymerized with comparative difficulty, only a portion of the benzophenone is actually incorporated in the resultant resinous product by a copolymerization or chemical bonding mechanism. Effective amounts of the benzophenones may usually be chemically incorporated by employing a sufficiently high ratio of the unsaturated benzophenone in relation to the polymerizable monomer, specifically styrene. Ratios in the order of 1 part of the unsaturated benzophenone to 10 parts of the polymerizable monomer is sufficient to cause the formation of a copolymer containing from about 1 to 2 percent combined benzophenone. After the formation of the copolymer, the free of unreacted benzophenone may then be removed by extraction with a solvent in which the copolymer is insoluble. Or, if desired, the extraction of the unreacted unsaturated benzophenone may be omitted completely or in part, resulting composition containing varying amounts of unsaturated benzophenone, which by its presence may impart still more protective action to the composition. This latter procedure may be entirely satisfactory where potential leaching capacities of the resinous composition would not cause any adverse effects.

Where this extraction method is employed, the amount of ultraviolet absorber bound in the copolymer may be determined by a weight difference or the amount may be ascertained spectrophotometrically.

While our invention, in part, embraces all the unsaturated benzophenones of the type described hereinabove, the allyl derivatives, especially those derived from the tetrahydroxybenzophenone and the trihydroxybenzophenone have particular advantages of better miscibility with comonomers and more efficient copolymerization potentials, as well as more efficient untraviolet protection.

In order that the present invention may be more completely understood, the following examples are set forth in which all parts are parts by weight unless otherwise indicated. These examples are set forth primarily for the purpose of illustration and any specific enumeration of details contained therein should not be interpreted as a limitation on the case except as indicated in the appended claims.

PREPARATION OF 2-HYDROXY-4-ALLYLOXYBENZOPHENONE

To a stirred mixture of 42.8 parts of 2,4-di-hydroxy benzophenone, 27.6 parts of calcined potassium carbonate and 16.6 parts of potassium iodide in 120 parts of acetone is added 26.6 parts of allyl bromide. The mixture is heated at the reflux temperature, with stirring, until reaction is substantially complete. After 250 parts of water has been added, two layers form. An excess of 50% sodium hydroxide is added and 70 parts of petroleum ether is used to extract the alkaline insoluble oil. The aqueous alkaline solution is solidified and the solid which is formed is removed by filtration. Further crude product is obtainable by evaporation of the petroleum ether solution. The crude product can be purified by recrystallization from anhydrous alcohol.

2,2'-dihydroxy-4-allyloxy benzophenone may be prepared by the above procedure by using an equivalent quantity of 2,4,2'-trihydroxy benzophenone in place of the 2,4-dihydroxy benzophenone.

PREPARATION OF 2-HYDROXY-4-CROTOXYBENZOPHENONE

A mixture of 42.8 parts of 2,4-dihydroxy benzophenone, 33.8 parts of crotyl bromide, 30 parts of sodium carbonate, 80 parts of 95% alcohol and 30 parts of water heater at the reflux temperature with stirring until reaction is complete. The mixture is drowned in 1000 parts of water, acidified with concentrated hydrochloric acid and cooled in an icebath. The solid which forms is removed by filtration and crystallized from methanol.

PREPARATION OF 4-(BETA-METHALLYLOXY)-2-HYDROXYBENZOPHENONE

A mixture of 42.8 parts of 2,4-dihydroxybenzophenone, 22.4 parts of beta-methallyl chloride, 30 parts of sodium carbonate, 80 parts of 95% alcohol and 30 parts of water is stirred at the reflux temperature until the reaction is complete. After drowning the mixture in 1000 parts of water and acidifying with concentrated hydrochloric acid, the solid which separates is removed by filtration. It is crystallized from methanol.

PREPARATION OF 2-HYDROXY-4(2-CYANOVINYLOXY-)BENZOPHENONE

A mixture of 2.4 parts of 2,4-dihydroxybenzophenone, 11 parts of 2-chloroacrylonitrile, 15 parts of sodium carbonate, 80 parts of 95% alcohol and 30 parts of water is stirred at room temperature for a short period of time and then heated at the reflux temperature for an additional period until the reaction is complete. The mixture is then drowned in 700 parts of water and the drowned mixture is acidified with concentrated hydrochloric acid, whereupon a solid material separates and is removed by filtration. After repeated recrystallization from methanol, the product is obtained in form of a pale yellow solid.

PREPARATION OF 4(2-VINYLOXYETHOXY)-2-HYDROXYBENZOPHENONE

To a solution of 21.4 parts of 2,4-dihydroxybenzophenone in 125 parts of water containing 4 parts of sodium hydroxide is added 10.7 parts of 2-chloroethyl vinyl ether. The mixture is heated at the reflux temperature until the reaction is complete. It is then drowned in 1000 parts of water, and cooled in an icebath. The solid which separates is crystallized from methanol, giving the product in the form of light tan clear crystals.

Example 1

Copolymers of styrene with various unsaturated hydroxy benzophenones are prepared by heating in a suitable reaction vessel, a mixture of 9 parts of styrene with 1 part of the benzophenone in the presence of 0.01 part of dibenzoyl peroxide. The temperature is increased from an initial temperature of 80° C. to about 120° C. over a six day period, the samples being heated a total of nine days. The resulting copolymer is removed from the sealed tube and added to benzene, using sufficient benzene so that approximately a 5% solution resulted. After the copolymer has completely dissolved, the solution is added slowly with agitation to an excess of methanol. After the mixture has stood for several hours, the solid product is removed by filtration, washed several times with methanol, dried and then ground to a fine powder by ball-milling. The products are then analyzed for benzophenone content spectrophotometrically. For this determination, a 0.1 gram sample is dissolved in 1000 ml. of toluene and spectrophotometric curves are determined on a Spectracord using a hydrogen light source. The curves are taken over a range from approximately 300 mu to 400 mu, the reference medium being toluene. The concentration of the benzophenone in the copolymer toluene solution is calculated by the formula:

$$e = \frac{D}{al}$$

where $e$ is concentration in grams per liter
D is optical density
$a$ is the absorptive coefficient
$l$ is cell thickness in cm.

This concentration perliter divided by the weight of the copolymer samples per liter, multiplied by 100 is the percent ultraviolet absorber in the copolymer. Any remaining unreacted benzophenones are removed from the copolymer by extracting with 95% alcohol in a Soxhlet extractor. The amount of benzophenone extracted is determined periodically by spectrophotometric analysis. In all cases, the extraction is carried out until substantially no further benzophenone is extractable.

The following table summarizes the amount of several of these benzophenones in the copolymers before and after the alcohol extraction. The concentration of benzophenone in the copolymer before extraction is determined as described above. The concentration of benzophenone after extraction is the difference between the concentration in the unextracted copolymer and the amount in the alcohol extract. The efficiency of copolymerization is considered to be the percentage of monomeric benzophenone that has copolymerized.

| U. V. Absorber | Conc. (percent) Benzophenone in monomer mixture | Conc. (percent) Benzophenone in copolymer before extract | Conc. Benzophenone in copolymer after extract[b] | Percent Efficiency of copolymerization |
|---|---|---|---|---|
| 2-Hydroxy-4-allyloxy benzophenone | 10 | 2.34 | 1.05 | 10.5 |
| 4-Crotoxy-2-hydroxy benzophenone | 10 | 0.884 | 0.008 | 0.08 |
| 4-(beta-Methallyloxy)-2-hydroxy benzophenone | 10 | 0.892 | 0.545 | 5.45 |
| 4-(2-Cyanovinyloxy) 2-hydroxy benzophenone | 10 | 1.06 | 0.69 | 6.9 |
| 4,4'-diallyloxy-2,2'-dihydroxy benzophenone | 10 | 1.45 | 1.34 | 13.4 |
| 4-(2-vinyloxyethoxy) 2-hydroxy benzophenone | 6.7 | 0.354 | (a) | a(5.33) |
| 4,4'-dimethallyloxy-2,2'-dihydroxy benzophenone | 10 | 1.07 | 1.00 | 10.0 |
| 4,4'-dicrotoxy-2,2'-dihydroxy benzophenone | 6 | 0.116 | (a) | a(1.98) |

[a] Not extracted.
[b] Hours for extraction ranged from about 3 to 160.

Example 2

To a sample of inhibitor-free methyl styrene, comprising a mixture of o-, m- and p-methyl styrenes containing 33%, 2% and 65%, respectively, were added tertiary butyl hydroperoxide and tertiary butyl catechol in the amounts of 0.02% and 0.005%, respectively, based on the weight of the monomer. A portion of this composition was charged to a 38 mm. x 300 mm. drawn-neck test tube. The test tube was purged with purified nitrogen so as to remove air and was immediately sealed with an oxygen torch. To another portion of the monomer composition was added 0.2% by weight of 2-hydroxy-4-allyloxy benzophenone. This composition was charged to a test tube in the manner indicated above. The tubes were then placed in an oil bath at 100° C. for four days followed by three days at 130° C. After cooling, the glass was removed from the hard, clear white polymers. The polymers were then granulated in a stainless steel granulator and then molded into 1/8" thick-3" diameter discs. The discs were then exposed in a FDA Atlas Fadeometer. The test discs were exposed for 300 hours after which period the percent polymer yellowing was determined for each disc. The percent polymer yellowing for the control sample containing no UV absorber was found to be 9.4 whereas the disc prepared from the monomer containing the color stabilizer 2-hydroxy, 4-allyloxy benzophenone has a percent yellowing value of 6.1 The percent yellowing is determined according to the formula:

$$\frac{R-B}{G}$$

where R, B and G are the light transmission of the sample with Eastman trichromatic red, blue and green color filters, respectively. The light transmission values are determined in the General Electric Recording Spectrophotometer.

Example 3

A copolymer of o-, m-, and p-methyl styrene-acrylonitrile (same isomer mixture as in Example 2) in the weight ratio of 70/30 was made according to the procedure employed in making the polymer of Example 2. Similarly, a methyl styrene-acrylonitrile copolymer containing 0.2% 2-hydroxy, 4-allyloxy benzophenone was prepared. The copolymer containing no light stabilizer and the copolymer containing the benzophenone light stabilizer were molded into test discs following the procedure employed in Example 2. The percent polymer yellowing after 200 hours exposure to a source of ultraviolet light was 6.3% for the copolymer containing the light stabilizer and 8.6% for the unstabilized copolymer.

Example 4

An unsaturated polyester resin was prepared from 4 mols of maleic anhydride, 2 mols of phthalic anhydride and 6.7 mols of propylene glycol in a conventional manner. The resin had an acid number of 37. 28 parts of the polyester resin were combined with 2 parts diallylphthalate, 50 parts calcium carbonate, 20 parts alpha-cellulose, 0.45 part benzyl peroxide, 1 part zinc stearate and 0.0225 part ditertiary butyl para-cresol. These ingredients were dry mixed for 20 minutes in a dough mixer. The dry blend was then mixed in a two-roll differential mill for ten minutes at 150° F. The flexible sheet taken from the differential rolls was cooled to room temperature and chopped in a comminuting machine to give a catalyzed granular molding composition ready for use. A molding composition identical to that given above was prepared except that 0.15 part of 4-crotoxy-2-hydroxy benzophenone was incorporated in the composition during the dry mixing step. These respective compositions were molded then into 1/8" plates using a temperature of 300° F. and 3000 p.s.i. The plates were then exposed in a Fadeometer for 300 hours. After this exposure, it was noted visually that the control sample containing no light stabilizer had darkened considerably more than the composition containing the 4-crotoxy, 2-hydroxy benzophenone.

Example 5

A clear thermoplastic sheet is formed from an intimate blend of 1 part 2,2'-dihydroxy-4-allyloxy benzophenone, 100 parts of polyvinyl butyral resin and 40 parts of trioctyl phosphate (plasticizer). Safety glass is laminated in conventional manner using a sheet of this composition as the plastic interlayer, and the laminated glass is found to provide excellent protection from sunlight for auto upholstery fabrics.

Example 6

2,2'-dihydroxy-4-allyloxy benzophenone is milled into polyethylene in proportions of 0.1 and 0.2 at 325° F. and the two mixtures pressed into sheets 0.01 to 0.2" thick. The sheets are then exposed in a Fadeometer. The extent of the oxidation of the polymer is evidenced by the increase in the intensity of the carbonyl infrared band. Taking unprotected pure polyethylene as the standard of 100%, the degrees of observed oxidation for the stabilized specimens after 200 hours exposure were 28% and 24% for the films containing 0.1% and 0.2% of the allyloxy benzophenone, respectively.

Example 7

99 parts of methyl methacrylate monomer and 1 part of 4(2-vinyloxyethoxy)-2-hydroxy benzophenone were polymerized and simultaneously molded to give a plastic sheet 1/8" thick. An unstabilized sheet was prepared in a similar manner. The formed sheets were then polished to give optical clarity and thereupon tested for transmission of ultraviolet light having a wave length of 290–330 mu. The results are as follows:

| 1/8" Sheet | Transmission | |
|---|---|---|
| | At 290 mu | At 330 mu |
| Control | 20% | 79% |
| Stabilized Sample | Trace | Trace |

Reference is also made to application Serial No. 709,753, filed January 20, 1958 now U.S. Patent No. 2,962,533 wherein further information concerning the preparation of the benzophenones of this invention may be found.

We claim:
1. A resinous composition of matter resistant to the discoloring effects of light which comprises a thermo- plastic polymer of a polymerizable styrene and from about 0.01% and 5% of a 2-hydroxy-4-olefinicoxy benzophenone wherein the olefinicoxy substituent contains not in excess of 4 carbon atoms and wherein said benzophenone is a monohydroxy benzophenone.

2. A resinous composition of matter resistant to the discoloring effects of light which comprises a thermoplastic polymer of a polymerizable styrene and from about 0.01% to 5% of a 2-hydroxy-4-alkenyloxy benzophenone wherein the alkenyloxy substituent contains not in excess of 4 carbon atoms and wherein said benzophenone is a monohydroxy benzophenone.

3. A resinous composition of matter resistant to the discoloring effects of light which comprises a thermoplastic copolymer of a polymerizable styrene and is at least about 0.01% by weight based on the total weight of the composition of a 2-hydroxy-4-olefinicoxy benzophenone wherein the olefinicoxy substituent contains not in excess of 4 carbon atoms and wherein said benzophenone is a monohydroxy benzophenone.

4. A process for preparing a thermoplastic resinous composition of matter resistant to the discoloring effects of light which comprises copolymerizing a polymerizable styrene with a 2-hydroxy-4-olefinicoxy benzophenone wherein the olefinicoxy substituent contains not in excess of 4 carbon atoms and wherein said benzophenone is a monohydroxy benzophenone.

5. A resinous composition of matter resistant to the discoloring effects of light which comprises a thermoplastic copolymer of a styrene and at least about 0.01% based on the composition of 2-hydroxy-4-allyloxy benzophenone.

6. A resinous composition of matter resistant to the discoloring effects of light which comprises a substantially uniform physical dispersion of from about 0.01% to 5% of 2-hydroxy-4-allyloxy benzophenone in a polystyrene.

7. A resinous composition of matter resistant to the discoloring effects of light which comprises a substantially uniform physical dispersion of from about 0.01% to 5% of 2-hydroxy-4-allyloxy benzophenone in polystyrene.

8. A process for preparing a thermoplastic resinous composition of matter resistant to the discoloring effects of light which comprises copolymerizing a styrene and 2-hydroxy-4-allyloxy benzophenone.

References Cited by the Examiner

UNITED STATES PATENTS

| | | | |
|---|---|---|---|
| 2,777,828 | 1/57 | Day | 260—866 |
| 2,937,157 | 5/60 | Clark | 260—45.95 |

MURRAY TILLMAN, *Primary Examiner.*

UNITED STATES PATENT OFFICE
CERTIFICATE OF CORRECTION

Patent No. 3,215,665                November 2, 1965

Robert R. Sharetts et al.

It is hereby certified that error appears in the above numbered patent requiring correction and that the said Letters Patent should read as corrected below.

Column 1, lines 27 to 31, the formula should appear as shown below instead of as in the patent:

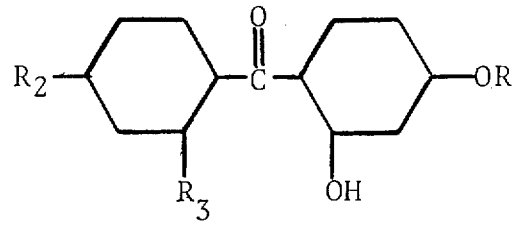

column 3, line 22, for "benzophenomes" read -- benzophenones --; column 7, line 55, for "heater" read -- is heated --.

Signed and sealed this 12th day of July 1966.

(SEAL)
Attest:

ERNEST W. SWIDER                EDWARD J. BRENNER
Attesting Officer              Commissioner of Patents